April 6, 1926.
A. G. YORK
1,579,686
DISPLAY STAND
Filed April 15, 1924 3 Sheets-Sheet 1
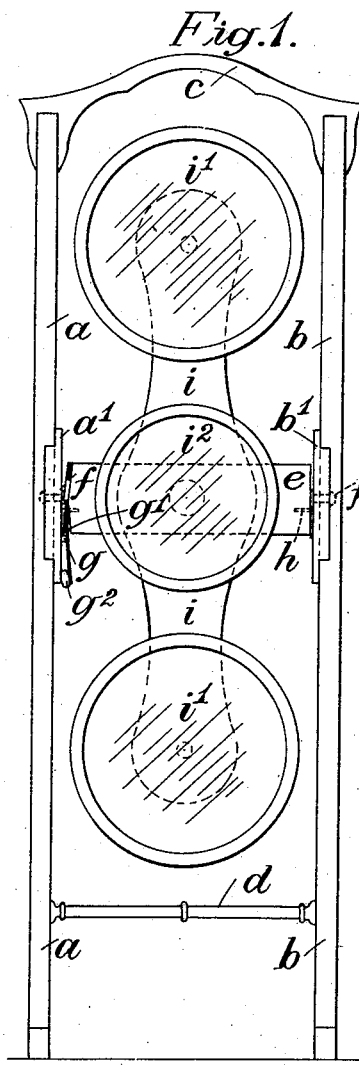
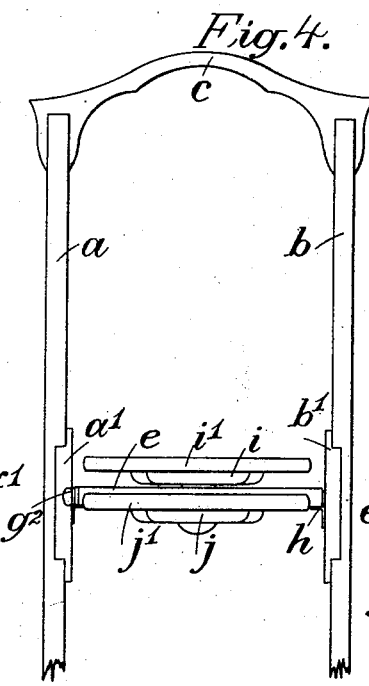
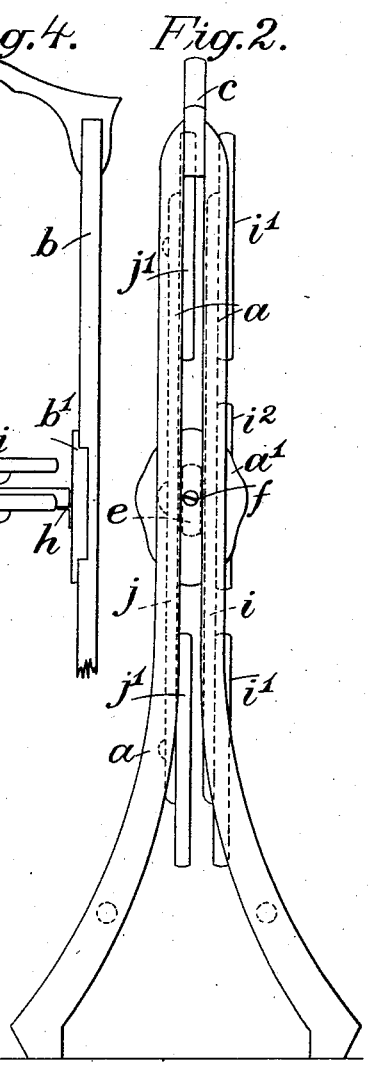
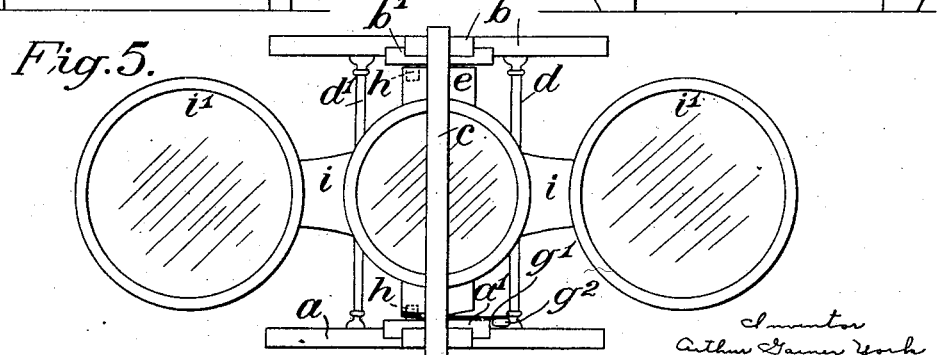

April 6, 1926.
A. G. YORK
DISPLAY STAND
Filed April 15, 1924
1,579,686
3 Sheets-Sheet 2
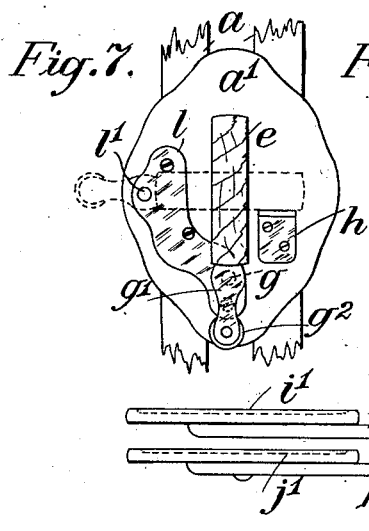
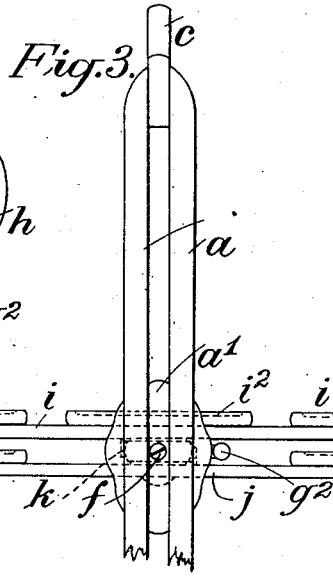
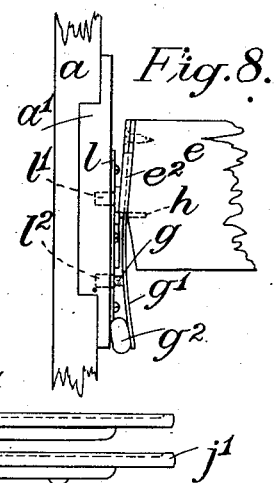
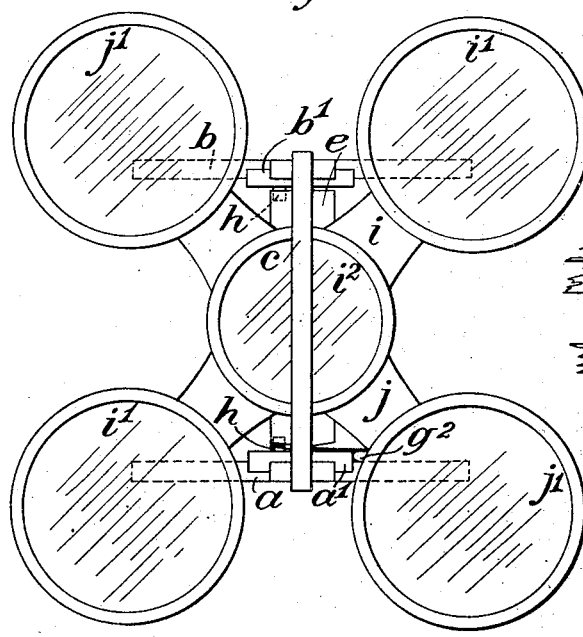
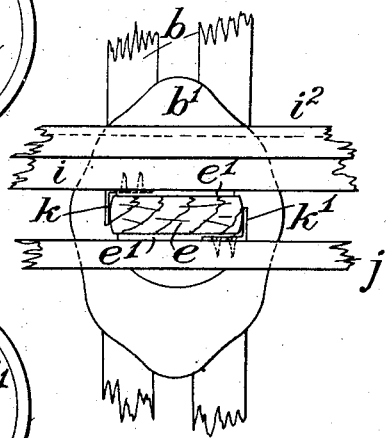

April 6, 1926.   1,579,686
A. G. YORK
DISPLAY STAND
Filed April 15, 1924   3 Sheets-Sheet 3
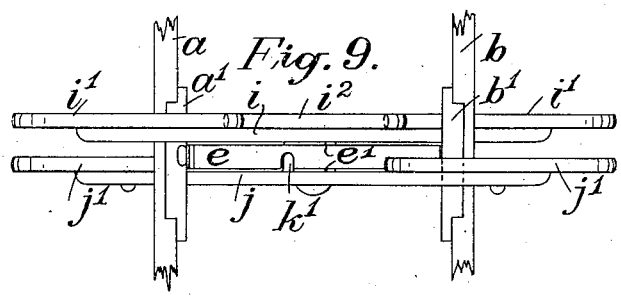
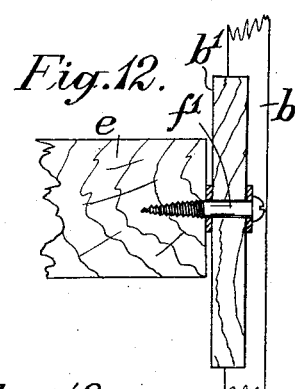
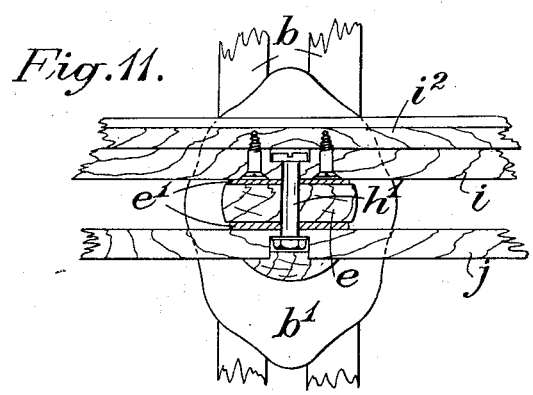
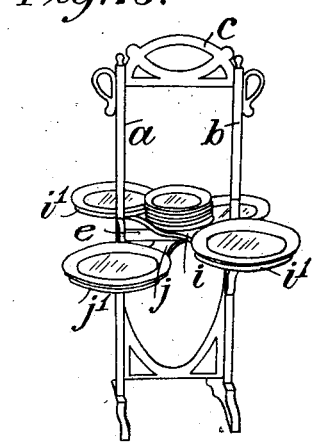
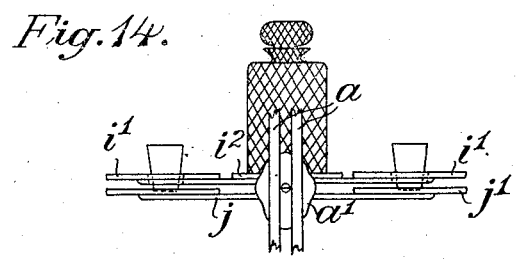
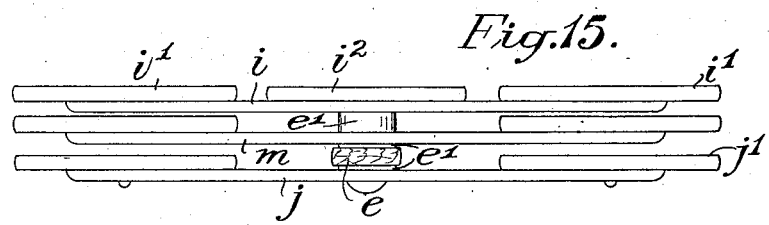

Patented Apr. 6, 1926.

1,579,686

UNITED STATES PATENT OFFICE.

ARTHUR GARNER YORK, OF LONDON, ENGLAND.

DISPLAY STAND.

Application filed April 15, 1924. Serial No. 706,639.

*To all whom it may concern:*

Be it known that I, ARTHUR GARNER YORK, a British subject, residing at London, England, have invented certain new and useful Improvements in Display Stands; and I do hereby declare the following to be a full, clear, and exact description of the invention, such as will enable others skilled in the art to which it appertains to make and use the same.

This invention relates to improvements in portable and collapsible stands for supporting or displaying articles, and more especially to articles of furniture generally known as cake-stands, candy-stands and the like.

According to the present invention the stand comprises an open framework upon or within which is transversely mounted a movable cross-bar having pivoted thereon a plurality of arms adapted to be projected in opposite directions from the stand in order to provide supports for plates, dishes or other articles which are thereby carried in approximately the same horizontal plane.

These pivoted arms can be closed up in the vertical position within the framework of the stand. The cross-bar can rotate upon a horizontal axis through 90° and the arms are mounted upon the cross-bar by means of one or more pivots at right angles to said horizontal axis. In this way, dishes or the like can be placed in position upon the arms and be all practically at the same height instead of being located upon tiers at different levels, as is usually the case with cake-stands.

The present invention is hereafter described with reference to the accompanying drawings. Figure 1 is a front elevation, and Figure 2 is a side elevation of a cake-stand in the closed position with a pair of arms. Figure 3 is a view similar to part of Figure 2 but showing the cake-stand in the first stage of the open position with the arms still superposed and parallel. Figure 4 is a front view of Figure 3. Figure 5 is a plan view of Figure 3. Figure 6 is a plan view but showing the arms crossed, i. e., in the second stage of the open position. Figure 7 is a view on a larger scale of a suitable locking device for the rotatable cross-bar. Figure 8 is a front view of Figure 7. Figure 9 is a front elevation of Figure 6. Figure 10 is a cross section of the rotatable cross-bar showing the limiting stops. Figure 11 is a cross section on a larger scale through the vertical pivotal axis of the plate-carrying arms. Figure 12 is a sectional view of part of the rotatable cross-bar showing one of its horizontal pivots. Figure 13 is a perspective elevation of a differently shaped stand showing in position, plates for candy, pastry, fruit and the like. Figure 14 is a diagram similar to Figure 3, showing a modification in the upper tray. Figure 15 is a view similar to Figure 3 but showing three pivoted arms carried by the cross-bar.

The framework of the stand in Figures 1–6 is shown comprising duplicated uprights $a$ $b$ which are cross-connected at top by a rail $c$ forming a handle, and are connected at bottom by one or more rails $d$ $d^1$ between suitable feet or bases.

The upper portion of the framework affords a rectangular opening of a height equal for example to three times its width. Bosses or brackets $a^1$ $b^1$ are shown connecting the duplicated upright members on each side of the stand. Across the middle of this open framework there is fitted horizontally a flat cross-bar $e$ rotatable upon its axis, preferably by means of concealed or sunk pivots, as for example screws $f$ $f^1$ traversing the bosses $a^1$ $b^1$ upon or between the uprights $a$ and $b$.

The rotation of this cross-bar $e$ is limited to 90 degrees by means of a suitable latching or locking device. For this purpose I have shown (see Figures 7 and 8) a metal plate $l$ secured as by screws upon the inside of the boss $a^1$ upon the upright members $a$, this plate $l$ having a recess $l^1$ into which a corresponding stud $g$ on a spring blade $g^1$ can enter, so as to lock the parts $e$ and $a$ together. This blade $g^1$ is carried by a plate $e^2$ secured as by screws to the adjacent end of the cross bar $e$. A thumb piece $g^2$ at the extremity of the blade $g^1$ allows the stud $g$ to be lifted out of the recess $l^1$ when required.

The cross-bar $e$ rests upon one pair of stops $h$ when in the horizontal position, and it may bear against the sides of the same stops in the vertical position, these stops $h$ being secured upon the inside of the bosses $a^1$ $b^1$ upon the upright $a$ $b$ of the frame slightly below and to one side of the horizontal axis of rotation of the cross-bar. One of these stops is clearly shown in Figure 7 as a metal arm of inverted L-shape, The bar $e$ bears upon the stops $h$ when the stud $g$ is in the latching recess $l^1$.

At the centre of the cross-bar $e$ there is fitted a transverse pin or stud $h^1$, which occupies a vertical position when the cross-bar $e$ is in the working position with the arms projected horizontally and the bar $e$ resting on its stops $h$. By means of this pin $h^1$ there are shown rotatably mounted upon the cross-bar $e$ a pair of arms $i$ $j$ each extending on both sides of the cross-bar $e$ and of dimensions to fit inside the open portion of the framework (see Figure 1). A recess $l^2$ at the end of the plate $l$ opposite to the recess $l^1$ may be employed to receive the stud $g$ and lock the bar $e$ in the closed position wherein the arms are inside the open framework (as in Figure 1) and parallel with the uprights $a$ $b$.

In the first stage of the opening position, the arms $i$ $j$ are brought to the horizontal position (the bar $e$ turning through 90°) from the position of Figure 1 to the position of Figures 3 4 and 5.

The arms $i$ $j$ are shown provided with L-shaped stop pieces $k$ $k^1$ (see Figure 10) adapted to make contact with opposite sides of the cross-bar $e$ when the said arms are in their parallel position as shown in Figure 3. The pivot $h^1$ allows the arms $i$ $j$ to make sideways movement in one direction at either front or rear of the stand, and the stop pieces $k$ $k^1$ prevent the arms from making sideways movement in the other direction at either front or rear of the stand.

When the cross-bar $e$ has been turned so that it is secured by its stops $h$ and $g$ with the arms $i$ $j$ horizontal, the said arms may be crossed and spread out star fashion or fan-wise (see Figure 6) to provide four radiating supports which are approximately in the same horizontal plane. Each arm is enabled to make this sideways turning movement about the pivot $h^1$ in one direction, the respective stops $k$ $k^1$ preventing fanwise movement in the other direction. The arms $i$ $j$ being fitted upon the upper and lower faces (or opposite faces) of the bar $e$, the difference of level between the arms shown will be only that due to the thickness of the bar $e$, plus any spacing means such as washers $e^1$.

The shape of the arms $i$ $j$ may be as desired; they may be provided with circular trays or the like carrier members or with annular extremities $i^1$ $j^1$, such trays or rings on each arm $i$ $j$ being connected together by artistically shaped middle portions. These trays are shown provided with a peripheral bead or fence. The centre of the uppermost arm $i$ (see Figures 3, 5 and 6) may have a circular tray with peripheral beading or fence $i^2$, to hold a cake-dish or other article placed thereon, this additional support for a plate thereby concealing the top of the pivot $h^1$.

In the case of the application of the invention to a flower-stand, the supporting uprights $a$ $b$ need not project to any considerable extent above the axis, and the uprights might be of U-shape, for instance, as will be understood from Figure 13, and the top rail $c$ may be omitted or replaced by a horizontal circular frame.

If desired, a fixed or hinged shelf may be fitted between the uprights $a$ $b$ at a convenient distance from the bottom, for instance anchored upon the rails $d$ $d^1$, as will be obvious.

The arms fitted with the trays, or carrier members $i^1$ $j^1$ need not necessarily be symmetrical. They extend across the bar $e$ so as to project to back and front thereof and so that the pivot $h^1$ is arranged between the two carrier members $i^1$ or $j^1$ on each arm.

In Figure 14 the upper carrier member $i^1$ is apertured to permit the lower part of a glass tumbler to be passed therethrough and to rest upon the carrier member $j^1$ below, the glass tumbler being thus steadied by the member $i^1$.

Instead of two arms $i$ $j$ as shown, three or more arms may be mounted upon the cross-bar $e$, with appropriate spacing devices in the form of washers $e^1$ or the like between the arms on the same side or surface of the cross-bar $e$.

In Figure 15, I have shown three arms $i$ $j$ $m$ pivoted upon a common pivot $h^1$ seated in the cross-bar $e$. Washers $e^1$ mounted on the pivot $h^1$ are provided between the arm $m$ and the cross-bar $e$, and also between the arm $m$ and the arm $i$.

In this improved display stand, the carrier-members on the arms are all at substantially the same horizontal level so that all are accessible and at a convenient height from the ground, and a comparatively large number of carrier-members can be provided for a given size of open framework.

Having thus described my invention what I claim is:—

1. A display stand comprising a framework having upright members, an open space in said framework between said upright members, a single horizontal cross bar pivotally mounted across said open space and between said upright members, arms mounted on said cross bar and transversely of said cross bar, said arms being directly pivoted on said cross bar and adapted to be partly rotated on said cross bar, and carriers fixed in position upon and relatively to said arms, said cross bar being itself partly rotatable about its horizontal axis to bring it from a position in which the carrier-fitted arms are horizontal, to a position in which said arms are in a vertical position in the open space between said upright members.

2. A portable, collapsing display stand comprising a framework having upright members, an open space in said framework between said upright members, a single horizontal cross bar pivotally mounted across said open space and between said upright members, arms mounted on said cross bar and transversely thereof, said arms being substantially in the same plane relatively to the single cross bar, directly pivoted on said cross bar and adapted to be partly rotated on said cross bar in opposite directions, carriers fixed in position upon and relatively to said arms, said cross bar being itself partly rotatable about its horizontal axis to bring it from a position in which the carrier-fitted arms are horizontal, to a position in which said arms are in a vertical position in the open space between said upright members, and means for automatically locking in said positions the cross-bar with the carrier-fitted arms.

3. A portable, collapsing display stand comprising a framework having upright members, an open space in said framework between said upright members, a single cross bar pivotally mounted horizontally across said open space, arms pivotally mounted intermediately of their length upon and transversely of said cross bar, said pivotal mounting enabling said arms to be moved fanwise upon the said cross bar, and carriers permanently fixed at their underside in position upon each of said superposed arms so as to be supported from underneath, said cross bar being partly rotatable about its horizontal pivots to bring it from a position in which the carrier-fitted arms are horizontal and projected forwardly and rearwardly of the cross bar, to a position in which the display stand is collapsed and in which said arms are then in a vertical position in the open space between said upright members.

4. A collapsible display stand, comprising a framework, an open space in said framework, a cross-bar arranged transversely of said open space and horizontally journaled in said framework, a plurality of separate arms each pivotally mounted upon the cross-bar, the axis of said pivotal mounting of the arms being at right angles to the horizontal axis of the cross-bar, said cross-bar and arms being adapted to be turned from a position in which the arms are closed up in the said open space, to a position in which the arms project to front and rear of the stand and are then at approximately the same horizontal level.

5. A display stand comprising cross-connected uprights, a cross-bar horizontally journaled between said uprights, a plurality of arms directly pivoted on said cross-bar intermediate of their length to permit fanwise movement, carrier-members mounted on the ends of said pivoted arms, said cross-bar being adapted to be rotated from a position in which the arms are substantially vertical to a position in which the arms are horizontal, stops carried by the uprights and upon which the cross-bar bears in its extremital positions, means for automatically locking the cross-bar in its extremital positions, and means for limiting the fanwise movement of the arms relatively to the cross-bar.

6. A display stand comprising cross-connected uprights, a cross bar horizontally mounted between said uprights, said cross bar being partly rotatable about a horizontal axis, a plurality of arms pivoted intermediate of their length upon said cross bar and at right angles to the axis of the pivot of the cross bar and carriers fixed in position upon and relatively to said arms, said cross bar and arms being adapted to be turned from a position in which the arms are parallel with the uprights to a position in which the said arms are horizontal and at substantially the same level, and said carrier-supporting arms when in the horizontal position being adapted to be crossed in plan and spread out fan-wise.

7. A display stand, comprising an open-framed support, a cross-bar journaled in and across said open-framed support, said cross-bar being adapted to be partly rotated, a plurality of separate arms pivotally secured intermediate of their length upon said cross-bar and participating in the rotary movement of said cross-bar, spacing means between said arms and the cross-bar, said arms being capable of fanwise movement upon the cross-bar, said cross-bar being adapted to be turned into a closed position in which the said arms are inside the open-framed support or into an operative position in which the said separate arms are at substantially the same horizontal level, the actual difference in horizontal levels being only that of the height of the cross-bar and the thickness of the spacing means, and means for locking the cross-bar in said operative position.

8. A display stand comprising cross-connected uprights, a cross bar horizontally pivoted between said uprights, a plurality of separate arms pivoted on said cross bar intermediate of their length and at right angles to the pivot of the cross bar and carriers fixed in position upon and relatively to said arms, said arms being arranged in one position to be held vertically parallel with the uprights of the stand, said cross bar being adapted to be turned through a right angle to bring the arms to a horizontal position, said carrier-supporting arms having fanwise movement about their pivotal axis on the cross bar, and stop pieces carried by the arms to limit said fanwise movement.

9. A device of the character described, comprising a pair of uprights, a horizontal cross-bar of rectangular cross section pivotally mounted between said uprights and capable of being turned through a right angle, a ring-fitted arm pivoted upon the wider upper face of the horizontal cross bar, a tray-fitted arm pivoted upon the wider lower face of the cross bar so that said ring can register with said tray, said arms participating in the turning movement of the cross bar, and said pivot for the upper and lower arms being at right angles to the horizontal axis of the cross bar.

10. A device of the character described, comprising a pair of cross-connected uprights, a horizontal cross-bar pivotally mounted between said uprights and capable of being turned through a right angle, a pair of parallel, tray-fitted arms pivoted upon the horizontal cross-bar and participating in the turning movement of the cross-bar, said pivot for the arms being at right angles to the horizontal axis of the cross-bar, and enabling the arms to be spread fanwise in opposite directions, a central tray upon the upper arm and above the pivots for the arms, and means for locking the cross-bar in position such that the tray-fitted arms pivoted on the cross-bar are at horizontal levels differing by the thickness of the said cross-bar.

11. A device of the character described, comprising a pair of uprights, cross rails between the uprights, the uppermost one of said rails forming a handle, a horizontal cross-bar pivotally mounted between said uprights and capable of being turned through a right angle, a pair of parallel, tray-fitted arms pivoted upon the horizontal cross-bar and participating in the turning movement of the cross-bar, said arms being separated from the cross-bar by spacing means and extending across the cross-bar, means for locking the cross-bar in position such that the tray-fitted arms pivoted on the cross-bar are at horizontal levels which differ by the thickness of the said cross-bar and the spacing means, and means for limiting the fanwise movement of the arms about their pivot.

In testimony whereof I affix my signature.

ARTHUR GARNER YORK.